(12) United States Patent
Murakami

(10) Patent No.: US 8,024,053 B2
(45) Date of Patent: Sep. 20, 2011

(54) SAFETY INSTRUMENTATION SYSTEM AND PLANT SAFETY SYSTEM

(75) Inventor: Takeshi Murakami, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/890,447

(22) Filed: Aug. 6, 2007

(65) Prior Publication Data

US 2008/0082184 A1    Apr. 3, 2008

(30) Foreign Application Priority Data

Aug. 10, 2006  (JP) ................................. 2006-217653

(51) Int. Cl.
G05B 9/02 (2006.01)
G06F 19/00 (2006.01)
G06F 11/00 (2006.01)

(52) U.S. Cl. ................ 700/79; 702/183; 714/1; 714/24; 714/31; 700/108; 700/110

(58) Field of Classification Search ................... 700/79, 700/108, 110; 714/1, 24, 31; 702/183
See application file for complete search history.

(56) References Cited

U.S. PATENT DOCUMENTS

| | | | |
|---|---|---|---|
| 4,638,433 A | 1/1987 | Schindler | |
| 5,278,480 A | 1/1994 | Murray | |
| 6,246,318 B1 | 6/2001 | Veil et al. | |
| 6,647,301 B1 * | 11/2003 | Sederlund et al. | 700/79 |
| 6,898,468 B2 * | 5/2005 | Ott et al. | 700/21 |
| 6,975,966 B2 * | 12/2005 | Scott et al. | 702/183 |
| 7,289,861 B2 * | 10/2007 | Aneweer et al. | 700/110 |
| 7,330,768 B2 * | 2/2008 | Scott et al. | 700/79 |
| 2003/0058602 A1 | 3/2003 | Veil | |
| 2004/0196003 A1 | 10/2004 | Graff et al. | |
| 2005/0080803 A1 * | 4/2005 | Sauermann | 707/101 |

FOREIGN PATENT DOCUMENTS

| | | |
|---|---|---|
| JP | 64-059401 A | 3/1989 |
| JP | 07-219667 A | 8/1995 |
| JP | 2005-085271 A | 3/2005 |
| JP | 2006-164143 | 6/2006 |

OTHER PUBLICATIONS

Communication dated Dec. 28, 2009 issued in corresponding European Patent Application No. 07014449.8.
Japanese Office Action dated Jun. 15, 2010, issued in corresponding Japanese Patent Application No. 2006-217653.

* cited by examiner

*Primary Examiner* — Kakali Chaki
*Assistant Examiner* — Sivalingam Sivanesan
(74) *Attorney, Agent, or Firm* — Westerman, Hattori, Daniels & Adrian, LLP

(57) ABSTRACT

An instruction converting unit converts the data form of an instruction of an operation received by a receiving unit to the data form of a safety instrumentation system from the data form of a plant control system. An operation carrying out unit receives the instruction of the operation obtained by the instruction converting unit and an original instruction of the safety instrumentation system to carry out the operations, and preferentially carries out the operation of the original instruction of the safety instrumentation system when both the instructions compete with each other.

6 Claims, 4 Drawing Sheets

SAFETY INSTRUMENTATION SYSTEM AND PLANT SAFETY SYSTEM

This application claims priority to Japanese Patent Application No. 2006-217653, filed Aug. 10, 2006, in the Japanese Patent Office. The priority application is incorporated by reference in its entirety.

TECHNICAL FIELD

The present disclosure relates to a safety instrumentation system connected to a plant control system, and a plant safety system including the safety instrumentation system and the plant control system, and more particularly to a safety instrumentation system that can construct a unified environment.

RELATED ART

A safety instrumentation system aiming to ensure the safety of a plant has been known. The safety instrumentation system is provided as a separate system independent of the plant control system for controlling the field device of the plant so that the safety instrumentation system can assuredly operate to ensure a safety.

On the other hand, in order to improve operability, a technique for uniting the plant control system with the safety instrumentation system has been developed. In order to unite these systems with each other, both the systems are connected together by a common communication line to achieve a communication between the systems. FIG. 4 shows the structure of such a united system and a safety instrumentation system 110 and a distributed control system 120 are connected together through a communication line 30. In the safety instrumentation system 110, a safety control station 101 is provided for carrying out a process to realize the safety of a plant. To the safety control station 101, valves 4 are connected through an input and output device 3. Further, in the distributed control system 120, a monitor station 107 is provided for monitoring field controllers 6 for controlling field devices and the entire part of the plant.

The united structure of the safety instrumentation system and the control system is disclosed in, for instance, Japanese Patent Unexamined Publication No. 2006-164143.

As shown in FIG. 4, when the distributed control system 120 and the safety instrumentation system 110 are connected to each other, the device of the safety instrumentation system 110 can be operated from the monitor station 107 of the distributed control system 120. For instance, the field controller 6 for originally controlling the field device may be possibly assigned to the operation of the device of the safety instrumentation system. In such a method, data of the valve 4 treated in the safety control station 101 of the safety instrumentation system 110 is coordinated with data treated in the field controller 6. Further, a communication function between the safety control station 101 and the field controller 6 is added. Therefore, the device such as the valve 4 of the safety instrumentation system 110 can be operated from the monitor station 107 in the same method as that of the operation to the field device.

However, it requires a troublesome operation to coordinate the data of the safety control station 101 with the data of the filed controller 6. Thus, this operation imposes a burden on engineering. Further, the contents of the operation or the monitor to the device of the safety instrumentation system are restricted by the original function of the field controller 6. For instance, whether or not the contents of the operation are properly reflected on the state of the device cannot be recognized. Further, it is difficult to construct an arrangement for ensuring the assuredness and safety of an operation to be required for the safety instrumentation system 110.

SUMMARY

Exemplary embodiments of the present invention provide a safety instrumentation system that can operate a device of a safety instrumentation system side through a plant control system by suppressing a burden of engineering, and a plant safety system including the safety instrumentation system and the plant control system.

A safety instrumentation system of one or more embodiments of the present invention is connected to a plant control system. One or more embodiments of the safety instrumentation system comprises: a receiving unit that receives an instruction of an operation to a device of the safety instrumentation system through an instruction receiving part for receiving an instruction of an operation to a field device of the plant control system; an instruction converting unit that converts the data form of the instruction of the operation received by the receiving unit to the data form of the safety instrumentation system from the data form of the plant control system so that the instruction received by the receiving unit can be used as the instruction of the operation to the device of the safety instrumentation system; and an operation carrying out unit that receives the instruction of the operation obtained from the instruction converting unit and an original instruction of the safety instrumentation system to carry out the operations, and preferentially carries out the operation of the original instruction of the safety instrumentation system when both the instructions compete with each other, and is characterized in that the instruction converting unit and the operation carrying out unit are formed by using a function block mounted on the safety instrumentation system.

According to this safety instrumentation system, since the instruction converting unit and the operation carrying out unit are formed by using the function block mounted on the safety instrumentation system, the burden of engineering can be suppressed.

When the instruction of the operation is received by the receiving unit, a certifying unit may be provided that certifies a user.

The safety instrumentation system of the present invention may include a display unit that displays, in the plant control system, the state of the field device of the plant control system; and a state converting unit that converts the data form of data showing the state of the device of the safety instrumentation system to the data form of the plant control system from the data form of the safety instrumentation system so that the state of the device of the safety instrumentation system can be displayed by the display unit.

The device of the safety instrumentation system may be a valve that carries out a shut down in a plant.

One or more embodiments of the present invention may include one or more the following advantages. For example, since the instruction converting unit and the operation carrying out unit are formed by using a function block mounted on the safety instrumentation system, the burden of engineering can be suppressed.

Other features and advantages may be apparent from the following detailed description, the accompanying drawings and the claims.

DETAILED DESCRIPTION

Now, referring to FIGS. 1 to 3, an exemplary embodiment of a safety instrumentation system according to the present invention will be described below.

Figure 1:
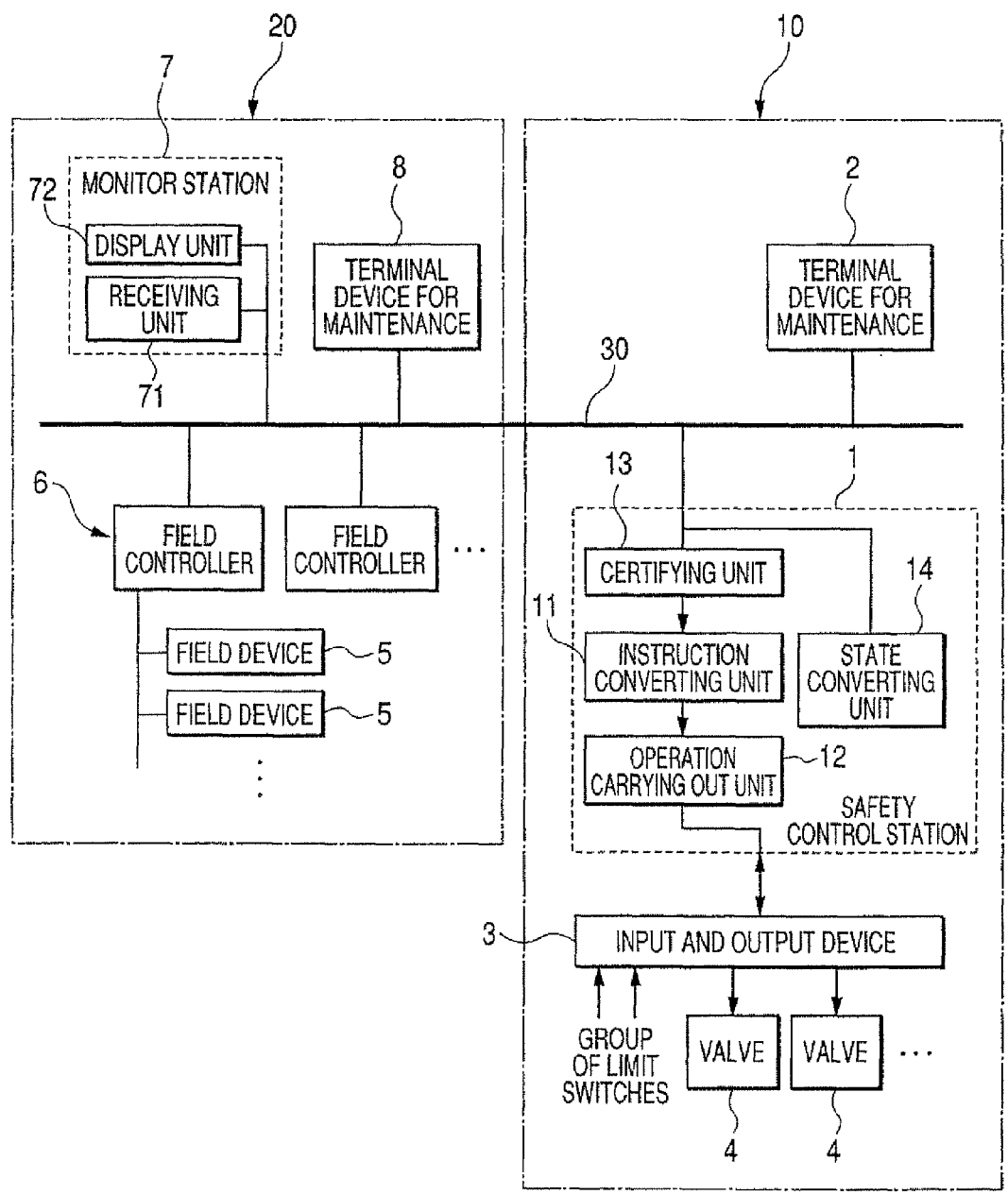
FIG. 1 is a block diagram showing the structure of a safety instrumentation system of an exemplary embodiment of the present invention.

FIG. 1 is a block diagram showing a structure of a safety instrumentation system of an exemplary embodiment.

As shown in FIG. 1, the safety instrumentation system 10 of the exemplary embodiment is connected to a distributed control system 20 through a communication line 30.

The distributed control system 20 includes field controllers 6, 6, ... distributed and arranged in a plant for controlling field devices 5, 5, ... , a monitor station 7 for monitoring and controlling the field devices 5, 5, ... through the field controllers 6, 6 ... , and a terminal device 8 for maintenance for maintaining and managing the distributed control system 20. The filed controllers 6, 6, ... , the monitor station 7 and the terminal device 8 for maintenance are connected together through the communication line 30.

In the monitor station 7, operation output values MV to the field devices 5, 5 ... , and process values PV to the field devices 5, 5 ... are displayed. Further, the monitor station 7 functions as an instruction receiving part for receiving an instruction of an operation to the field devices 5, 5 ....

The safety instrumentation system 10 includes a safety control station 1 for carrying out a process for maintaining the safety of the plant and a terminal device 2 for maintenance for maintaining and managing the safety instrumentation system 10. The safety control station 1 and the terminal device 2 for maintenance are connected to each other through the communication line 30.

Further, the safety control station 1 is connected to a group of limit switches or valves 4, 4, ... through an input and output device 3.

As shown in FIG. 1, the monitor station 7 of the distributed control system 20 includes a receiving unit 71 for receiving an instruction of an operation to the devices of the plant safety instrumentation system and a display unit 72 for displaying the states of the field devices 5, 5, ... of the plant control system 20.

Further, the safety control station 1 of the safety instrumentation system 10 includes an instruction converting unit 11; an operation carrying out unit 12; a certifying unit 13; and a state converting unit 14. The instruction converting unit 11 converts the data form of the instruction of the operation received by the receiving unit 71 to the data form of the safety instrumentation system 10 from the data form of the plant control system 20 so that the instruction received by the receiving unit 71 can be used as the instruction of the operation to the device of the safety instrumentation system 10. The operation carrying out unit 12 receives the instruction of the operation obtained by the instruction converting unit 11 and an original instruction of the safety instrumentation system 10 to carry out the operations, and preferentially carries out the operation of the original instruction of the safety instrumentation system 10 when both the instructions compete with each other. The certifying unit 13 certifies a user when the instruction of the operation is received by the receiving unit 71. The state converting unit 14 converts the data form of data showing the state of the device of the safety instrumentation system 10 to the data form of the plant control system 20 from the data form of the safety instrumentation system 10 so that the state of the device of the safety instrumentation system 10 can be displayed by the display unit 72.

Figure 2:
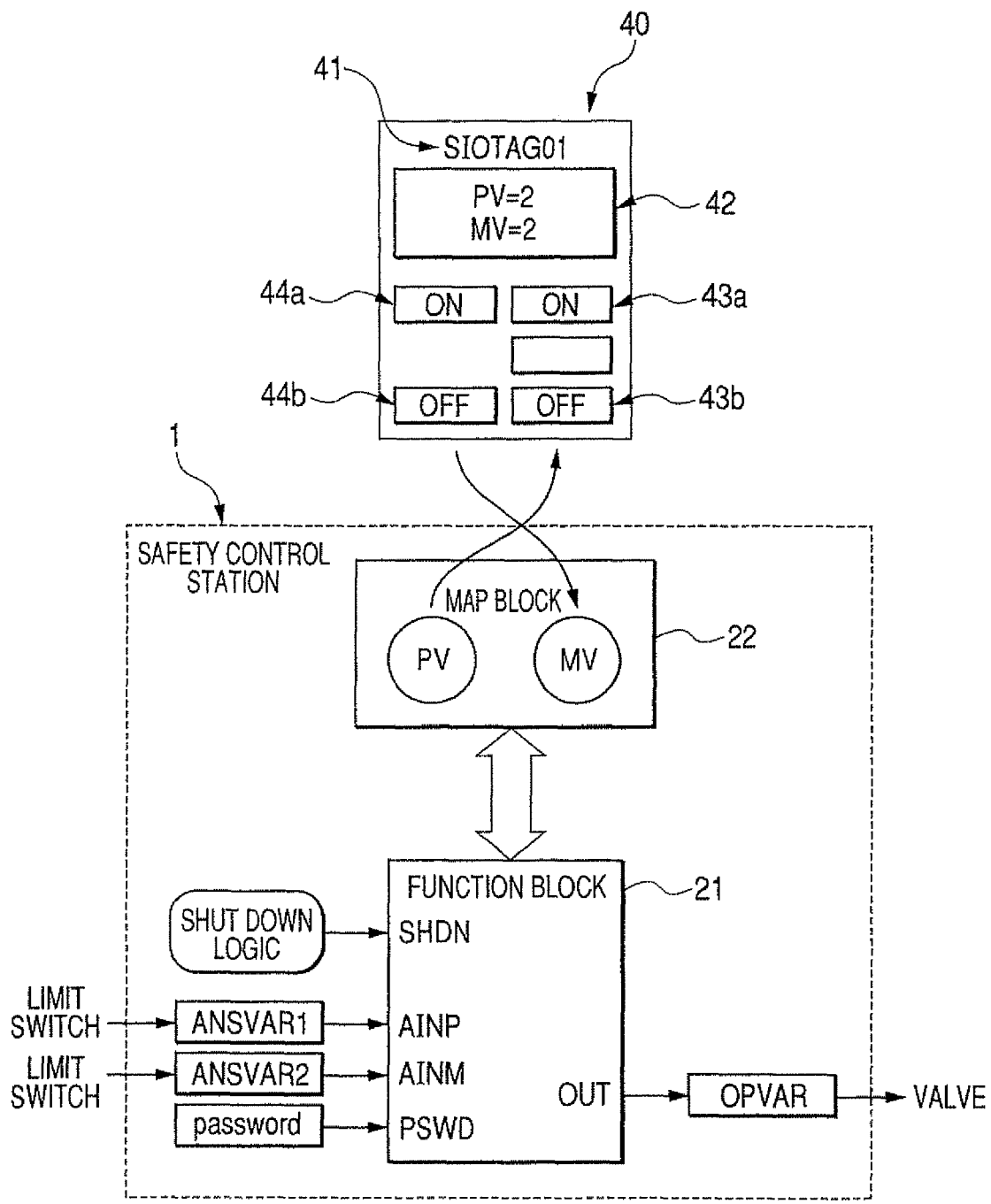
FIG. 2 is a diagram showing a function block and a map block mounted on a safety control station.

FIG. 2 is a diagram showing a function block and a map block mounted on the safety control station 1. As shown in FIG. 2, in the safety control station 1, a Boolean type manual operation function block 21 and a map block 22 are mounted relative to the various kinds of devices such as the valve 4.

In the function block 21, an operating procedure is defined that is related to a manual operation for the device of the safety instrumentation system. The instruction converting unit 11 and the operation carrying out unit 12 are formed by using the function block 21. In FIG. 2, a part of input and output elements of the function block 21 is omitted.

As shown in FIG. 2, to a shut down input terminal (SHDN) of the function block 21, a signal from a shut down logic mounted on the safety control station 1 is inputted.

A detecting signal of a limit switch for detecting the opening state of the valve 4 of the safety instrumentation system 10 is fetched as an input variable (ANSVAR1) of the safety control station 1 through the input and output device 3. The input variable (ANSVAR1) is inputted to an answer back input terminal (AINP) of the function block 21.

A detecting signal of a limit switch for detecting the closing state of the valve 4 of the safety instrumentation system 10 is fetched as an input variable (ANSVAR2) of the safety control station 1 through the input and output device 3. The input variable (ANSVAR2) is inputted to an answer back input terminal (AINM) of the function block 21.

An output terminal (OUT) of the function block 21 is connected to an output variable (OPVAR) supplied to the valve 4.

To the map block 22, parameters of the function block 21 are respectively transferred.

The parameters of the map block 22 are supplied to the monitor station 7 of the distributed control system 20 through the communication line 30 and displayed on a monitor screen as a face plate 40 shown in FIG. 2 by the display unit 72. Further, an operation to the faceplate 40 is supplied to the map block 22 through the receiving unit 71 and the communication line 30 and reflected on the parameters. The structure of the face plate 40 is the same as the structure of a faceplate for operating and monitoring the field device 5 of the distributed control system 20, so that an operator can operate the device of the safety instrumentation system with the same sense as that of an operation to the field device 5.

As shown in FIG. 2, in the face plate 40, a display area 41 of a tag name corresponding to the valve 4, a display area 42 of a process value (PV) and an operation output value (MV) of the valve 4, buttons 43a and 43b for displaying the process value (PV) and buttons 44a and 44b for receiving the input of the operation output value (MV) are provided.

Now, an operation carried out when the valve 4 of the safety instrumentation system 10 is operated by using the face plate 40 will be described below.

The operator can change the operation output value (MV) by operating the button 44a or 44b. The operation of the operator is reflected on the contents of the display of the display area 42. The operation for changing the operation output value (MV) is supplied to the safety control station 1 through the receiving unit 71 and the communication line 30 to instruct the map block 22 to change the operation output value (MV). When the operation output value (MV) of the map block 22 is changed, the changed value is transferred to the output variable (OPVAR) outputted from the output terminal (OUT) of the function block 21. The output variable (OPVAR) is outputted to the valve 4 through the input and output device 3.

The opening/closing state of the valve 4 is fetched to the function block 21 as the input variable (ANSVAR1) or the input variable (ANSVAR2) based on the detecting signal of the limit switch and converted to the process value (PV). The process value (PV) of the function block 21 is reflected on the map block 22 and supplied to the monitor station 7 of the distributed control system 20 through the communication line 30. The display unit 72 reflects the supplied process value (PV) on a display in the display area 42 and the buttons 43a and 43b of the face plate 40.

Accordingly, the operator compares the operation output value (MV) with the process value (PV) displayed on the face plate 40 so that the operator can recognize whether or not the operation to the operation output value (MV) is properly transmitted to the valve 4 to be operated.

In the safety instrumentation system of the exemplary embodiment, the function block 21 outputs the output variable (OPVAR) determined by the application software of the safety instrumentation system from the output terminal (OUT) preferentially to the operation to the operation output value (MV) through the face plate 40. When the signal inputted to the shut down input terminal (SHDN) of the function block 21 corresponds to a specific condition, a shut down output value is outputted from the output terminal (OUT) irrespective of the operation by the face plate 40.

Accordingly, for instance, even when an operation of the safety instrumentation system is temporarily released to operate the valve 4 during starting or maintaining the plant, if a new shut down phenomenon arises, the operation to the face plate 40 is neglected to assuredly shut down the plant. Therefore, when the device of the safety instrumentation system is manually operated, an unexpected situation can be avoided.

Further, in the safety instrumentation system of the exemplary embodiment, during the operation of the operation output value (MV) through the face plate 40, the operator is certified by the certifying unit 13. During the operation of the operation output value (MV), the operator is requested to input a password and the inputted password is supplied to the safety control station 1 through the communication line 30.

The inputted password is collated with a password of a password input terminal (PSWD) of the function block 21. Only when the passwords correspond to each other, the function block 21 receives the change of the operation output value (MV). Thus, a right for operating the valve 4 can be given only to a specific person.

As described above, according to the safety instrumentation system of the exemplary embodiment, the device of the safety instrumentation system 10 can be operated through the monitor station 7 of the distributed control system 20 like the field device 5 of the distributed control system 20. Further, an algorithm for realizing the above-described operation is described by the function block of the safety instrumentation system 10 side. Accordingly, a description by the application software of the distributed control system 20 side is not required, so that an engineering cost and an engineering burden can be extremely suppressed.

Figure 3:
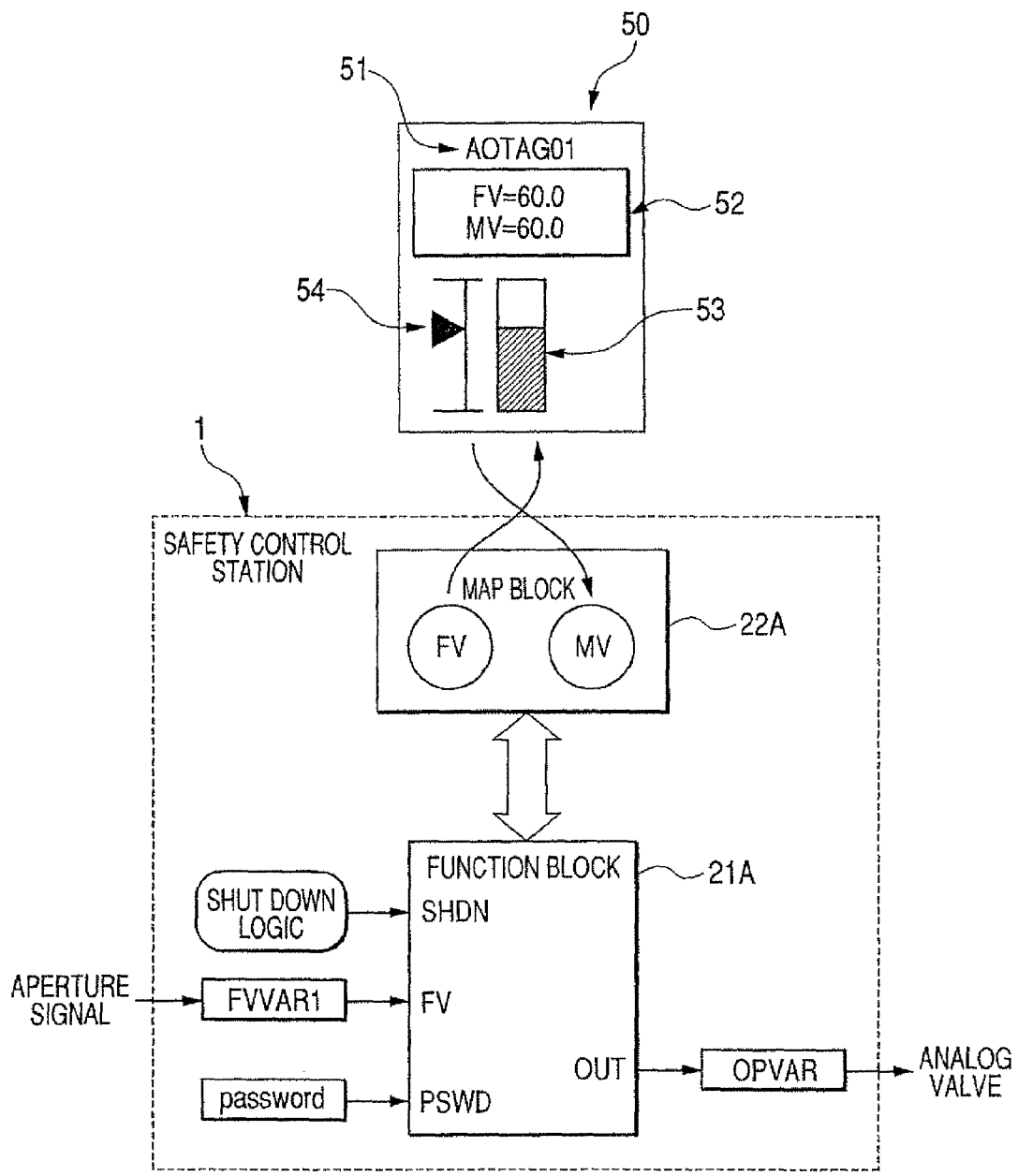
FIG. 3 is a diagram showing a function block and a map block when an analog valve is used as a device of the safety instrumentation system.
Figure 4:
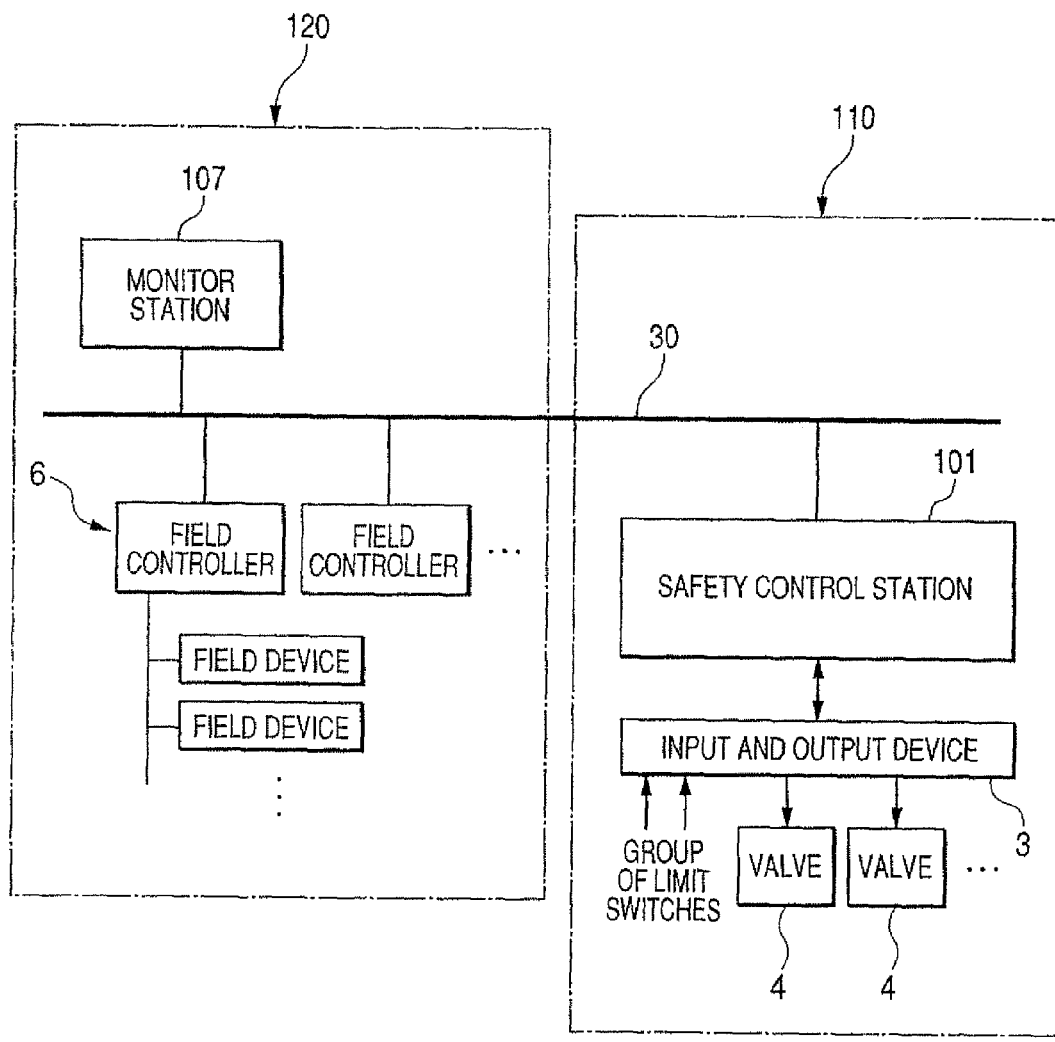
FIG. 4 is a block diagram showing the structure of a safety instrumentation system connected to a plant control system.

FIG. 3 is a diagram showing a function block and a map block when an analog valve is used as a device of the safety instrumentation system. As shown in FIG. 3, in the safety control station 1, an analog type manual operation function block 21A and a map block 22A are respectively mounted relative to analog valves.

In the function block 21A, an operating procedure is defined that is related to a manual operation for the analog valve. The instruction converting unit 11 and the operation carrying out unit 12 are formed by using the function block 21A. In FIG. 3, a part of input and output elements of the function block 21A is omitted.

As shown in FIG. 3, to a shut down input terminal (SHDN) of the function block 21A, a signal from a shut down logic mounted on the safety control station 1 is inputted.

A signal of an aperture sensor of the analog valve is fetched as an input variable (FVVAR1) through the input and output device 3. The input variable (FVVAR1) is inputted to a feedback input terminal (FV) of the function block 21A.

An output terminal (OUT) of the function block 21A is connected to an output variable (OPVAR) supplied to the analog valve.

To the map block 22A, parameters of the function block 21A are respectively transferred.

The parameters of the map block 22A are supplied to the monitor station 7 of the distributed control system 20 through the communication line 30 and displayed on a monitor screen as a face plate 50 shown in FIG. 3 by the display unit 72. Further, an operation to the face plate 50 is supplied to the map block 22A through the receiving unit 71 and the communication line 30 and reflected on the parameters. The structure of the face plate 50 is the same as the structure of a faceplate for operating and monitoring the field device 5 of the distributed control system 20, so that an operator can operate the device of the safety instrumentation system with the same sense as that of an operation to the field device 5.

As shown in FIG. 3, in the face plate 50, a display area 51 of a tag name corresponding to the analog valve, a display area 52 of a feedback value (FV) showing the opening degree of the analog valve and an operation output value (MV), an area 53 for displaying the feedback value (FV) and an area 54 for receiving an input of the operation output value (MV) are provided.

Now, an operation carried out when the analog valve of the safety instrumentation system is operated by using the face plate 50 will be described below.

An operator can change the operation output value (MV) by operating the area 54. The operation of the operator is reflected on the contents of the display of the display area 52. The operation for changing the operation output value (MV) is supplied to the safety control station 1 through the receiving unit 71 and the communication line 30 to instruct the map block 22A to change the operation output value (MV). When the operation output value (MV) of the map block 22A is changed, the changed value is transferred to the output variable (OPVAR) outputted from the output terminal (OUT) of the function block 21A. The output variable (OPVAR) is outputted to the analog valve through the input and output device 3.

The opening degree or aperture of the analog valve is fetched to the function block 21A as the input variable (FVVAR1) and reflected on the feedback value (FV). The feedback value (FV) of the function block 21A is reflected on the map block 22A and supplied to the monitor station 7 of the distributed control system 20 through the communication line 30. The display unit 72 reflects the supplied feedback value (FV) on a display in the display area 52 and the display area 53 of the face plate 50.

Accordingly, the operator compares the operation output value (MV) with the feedback value (FV) displayed on the face plate 50 so that the operator can recognize whether or not the operation to the operation output value (MV) is properly transmitted to the analog valve to be operated.

In the safety instrumentation system of the exemplary embodiment, the function block 21A outputs the output variable (OPVAR) determined by the application software of the safety instrumentation system from the output terminal (OUT) preferentially to the operation to the operation output value (MV) through the face plate 50. When the signal inputted to the shut down input terminal (SHDN) of the function block 21A corresponds to a specific condition, a shut down output value is outputted from the output terminal (OUT) irrespective of the operation by the face plate 50.

Accordingly, for instance, even when an operation of the safety instrumentation system is temporarily released to operate the analog valve during starting or maintaining the plant, if a new shut down phenomenon arises, the operation to the face plate 50 is neglected to assuredly shut down the plant. Therefore, when the device of the safety instrumentation system is manually operated, an unexpected situation can be avoided.

Further, in the safety instrumentation system of the exemplary embodiment, during the operation of the operation output value (MV) through the face plate 50, the operator is certified by the certifying unit 13. During the operation of the operation output value (MV), the operator is requested to input a password and the inputted password is supplied to the safety control station 1 through the communication line 30.

The inputted password is collated with a password of a password input terminal (PSWD) of the function block 21A. Only when the passwords correspond to each other, the function block 21A receives the change of the operation output value (MV). Thus, a right for operating the analog valve can be given only to a specific person.

As described above, the analog valve of the safety instrumentation system can be operated through the monitor station 7 of the distributed control system 20 like the field device 5 of the distributed control system 20. Further, an algorithm for realizing the above-described operation is described by the function block of the safety instrumentation system side. Accordingly, a description by the application software of the distributed control system 20 side is not required, so that an engineering cost and an engineering burden can be extremely suppressed.

An applied range of the present invention is not limited to the above-described exemplary embodiment. The present invention can be widely applied to the safety instrumentation system connected to the plant control system.

While the present invention has been described with respect to a limited number of embodiments, those skilled in the art, having benefit of this disclosure, will appreciate that other embodiments can be devised which do not depart from the scope of the present invention as disclosed herein. Accordingly, the scope of the present invention should be limited only by the attached claims.

What is claimed is:

1. A safety instrumentation system connected to a plant control system, said safety instrumentation system comprising:
   a receiving unit that receives an instruction of an operation to a device of the safety instrumentation system through an instruction receiving part for receiving an instruction of an operation to a field device of the plant control system;
   an instruction converting unit that converts the data form of the instruction of the operation received by the receiving unit to the data form of the safety instrumentation system from the data form of the plant control system so that the instruction received by the receiving unit can be used as the instruction of the operation to the device of the safety instrumentation system;
   an operation carrying out unit that receives the instruction of the operation obtained from the instruction converting unit and then carries out the operation based on the reception, and preferentially carries out an operation of shut down of a plant when shut down phenomenon arises;
   a display unit that displays, on a face plate which operates and monitors the field device in the plant control system, the state of the field device of the plant control system; and
   a state converting unit that converts the data form of data showing the state of the device of the safety instrumentation system to the data form of the plant control system from the data form of the safety instrumentation system so that the state of the device of the safety instrumentation system can be displayed on the face plate by the display unit,
   wherein the instruction converting unit and the operation carrying out unit are formed by using a function block mounted on the safety instrumentation system.

2. A safety instrumentation system according to claim 1, further comprising: a certifying unit that certifies a user when the instruction of the operation is received by the receiving unit.

3. A safety instrumentation system according to claim 1, wherein the device of the safety instrumentation system is a valve that carries out a shut down in a plant.

4. A plant safety system comprising;
   a plant control system; and
   a safety instrumentation system connected to the plant control system through a communication line, wherein the plant control system includes an instruction receiving part that receives an instruction of an operation to a field device of the plant control system,
   wherein the safety instrumentation system includes a receiving unit that receives an instruction of an operation to a device of the safety instrumentation system through the instruction receiving part of the plant control system, an instruction converting unit that converts the data form of the instruction of the operation received by the receiving unit to the data form of the safety instrumentation system from the data form of the plant control system so that the instruction received by the receiving unit can be used as the instruction of the operation to the device of the safety instrumentation system, and an operation carrying out unit that receives the instruction of the operation obtained from the instruction converting unit and then carries out the operation based on the reception, and preferentially carries out an operation of shut down of a plant when shut down phenomenon arises,
   wherein the plant control system further includes a display unit that displays, on a face plate which operates and monitors the field device in the plant control system, the state of the field device of the plant control system,
   wherein the safety instrumentation system further includes a state converting unit that converts the data form of data showing the state of the device of the safety instrumentation system to the data form of the plant control system from the data form of the safety instrumentation system so that the state of the device of the safety instrumentation system can be displayed on the face plate by the display unit, and wherein the instruction converting unit and the operation carrying out unit are formed by using a function block mounted on the safety instrumentation system.

5. A plant safety system according to claim 4, wherein the safety instrumentation system further includes a certifying unit that certifies a user when the instruction of the operation is received by the receiving unit.

6. A plant safety system according to claim 4, wherein the device of the safety instrumentation system is a valve that carries out a shut down in a plant.

* * * * *